Feb. 6, 1951 G. HERZOG 2,540,261
MEASUREMENT OF THICKNESS
Filed Jan. 8, 1946
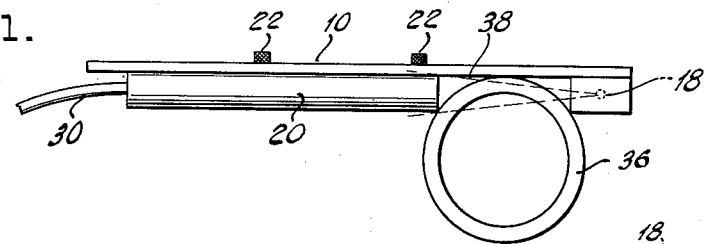
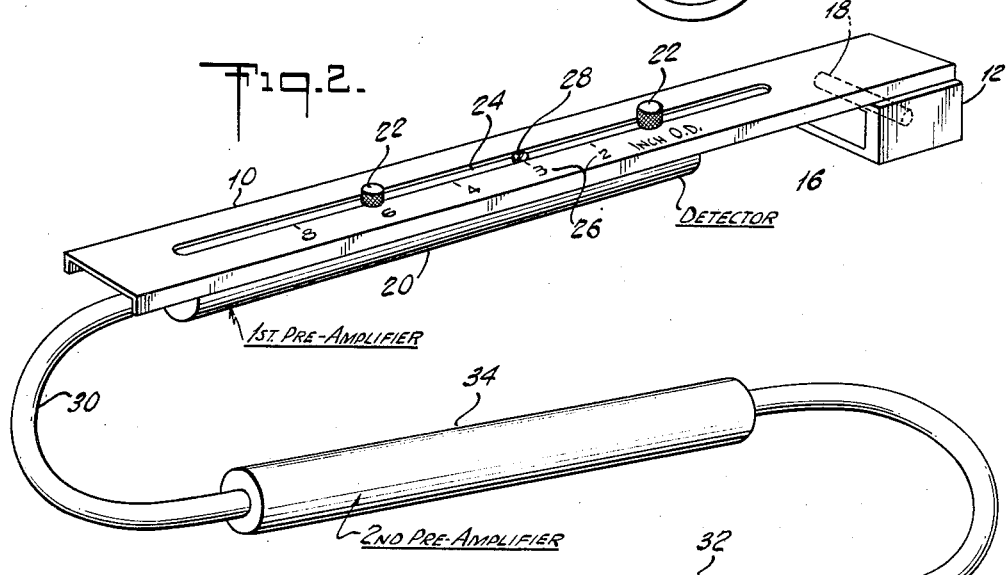
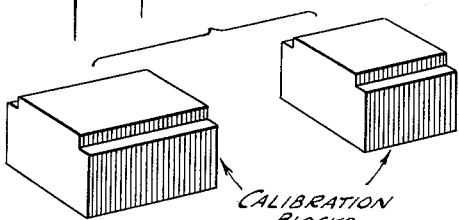
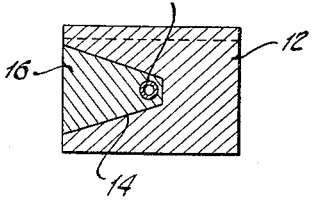
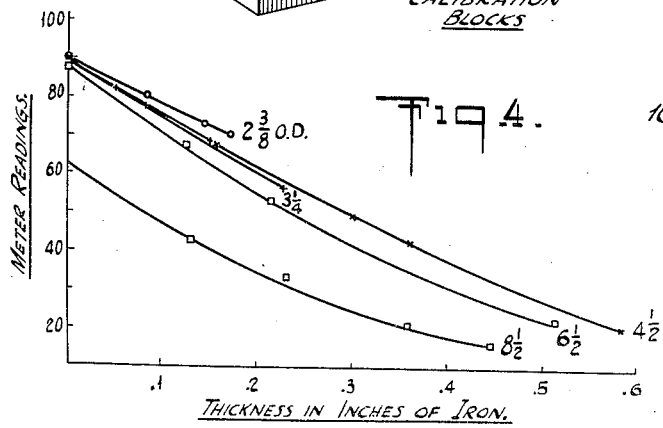
INVENTOR
GERHARD HERZOG.
BY
ATTORNEY Patented Feb. 6, 1951

2,540,261

UNITED STATES PATENT OFFICE 2,540,261

MEASUREMENT OF THICKNESS

Gerhard Herzog, Houston, Tex., assignor to The Texas Company, New York, N. Y., a corporation of Delaware Application January 8, 1946, Serial No. 639,826

1 Claim. (Cl. 250—83.6)

This invention relates to the measurement of thickness and particularly to a device or an apparatus for measuring accurately the thickness of a wall of a curved object such as a tube, pipe or vessel. The principal object of the invention is the provision of a device by means of which a very accurate reading of thickness may be obtained and which device is also so small that it can easily be used in places where there is but little room, such, for instance, as in the measuring of the wall thickness of tubes which are disposed in a parallel bank in a heat exchanger. The device is also applicable in the measurement of pipes of various shapes such as the return bends used in boilers and the like.

In the U. S. Letters Patent No. 2,349,429, granted May 23, 1944, to James H. Stein and myself a method has been disclosed for measuring the wall thickness of curved objects and which has been termed the "tangential" method. In accordance with the disclosure in that patent a beam of penetrative radiation is directed tangentially through the wall of the tube, pipe, or other object to a radiation detector and the measurement of the detected intensity of the radiation is an indication of the wall thickness. The present invention also relates to the method of measuring wall thickness wherein penetrative radiation is passed tangentially through the wall to a detector. The device of the present invention is considerably smaller and easier to handle in cramped or close quarters while at the same time the device is equally as sensitive, if not more so, than that disclosed in the aforementioned patent.

In accordance with the invention an elongated supporting member has secured to it at one end a holder containing a source of penetrative radiation such as gamma rays and mounted on the supporting member longitudinally and adjustably with respect to the source is a detector of the radiation. The detector housing may also contain a vacuum tube preamplifier from which a flexible cable extends to an instrument containing electronic circuits and a meter for indicating the detector output. Connected in the cable between the first preamplifier and the meter may be a second preamplifier, if desired. By arranging the preamplifiers in this manner losses in the cable are compensated. For calibration purposes a plurality of radiation absorber blocks of known absorption and different thicknesses may be inserted one at a time or in combination between the radiation source and the detector.

For a better understanding of the invention reference may be had to the accompanying drawing in which:

Figure 1 is an elevational side view showing the instrument in position on a pipe, Figure 2 is an isometric view of the device, Figure 2a is an isometric view of a pair of calibration blocks, Figure 3 is a cross section through the holder for the source of radiation, and Figure 4 is a set of calibration curves.

Referring to the drawing a supporting member 10 preferably in the shape of a channel for maximum strength and of a light weight metal such as aluminum has attached to it at the side at one end a holder 12 for a source of radiation. As shown more clearly in Figure 3 the holder 12 comprises essentially a block of metal such as lead containing an opening or window 14 in which is mounted a block 16 of metal such as aluminum through which radiation may pass comparatively easily. The source of radiation which may be a needle of radium 18 is mounted into blocks 12 and 16 so that the gamma rays from the radium may pass outwardly through the aluminum window 16. The block 12 being an absorber of the gamma rays serves to prevent the rays from passing out of the block in other directions. A cylindrical housing 20 about one inch in diameter is adapted to be secured rigidly to the side of the supporting member 10 as by means of a pair of bolts 22 extending through a slot 24 in the supporting member and which, when tightened, hold the housing tightly against the support. The supporting member is preferably provided with indicia 26 and a small projection 28 on the housing and within the slot 24 provides a reference whereby the position of the housing 20 on the support 10 can be adjusted in order that the device may be used to measure wall thickness of tubes or pipe of various diameters, say, between two inches and eight inches.

Within the end of the housing 20 toward the radiation source 18 is a radiation detector which may be a Geiger-Mueller counter of about three inches in length. If desired a gamma ray counter may be used of the type disclosed in the U. S. Letters Patent of D. G. C. Hare, No. 2,397,071, issued March 19, 1946. As stated above, a preamplifier may be disposed within the rear portion of the housing 20 back of the detector as shown, for instance, in the copending application of A. H. Lord, Jr., L. M. Evans, R. B. Heath and myself, Serial No. 574,870, filed January 26, 1945, now Patent #2 536,131. The output of the preamplifier is conducted through the flexible cable 30 to an instrument 32 which includes suitable amplifier and integration circuits and a meter for indicating the intensity of the radiation reaching the detector from the source 18. For a disclosure of a suitable circuit reference may be had to the aforementioned copending application, Serial No. 574,870. In order that the "head" of the instrument, i. e., the supporting member 10, source 18 and housing 20 may be manipulated easily and used at some distance from the meter 32, it may be found advisable to incorporate in the cable between the meter and the first preamplifier a housing 34 containing an intermediate amplifier in order to compensate electrical losses in the cable.

In Figure 1 the instrument head is shown in position on a tube or pipe 36 the wall thickness of which is to be measured. The bracket 10 is disposed at right angles to the longitudinal axis of the pipe 36 and in tangential contact with the pipe's outer surface, the radiation source holder or block 12 being also preferably in contact with the surface of the pipe as shown. The bolts 22 will be loosened and the detector housing 20 clamped to the supporting member at a position corresponding to the outside diameter of the pipe as indicated by the scale 26. A gamma ray beam from the source 18 will pass through the wall of the pipe 36 to the detector and will be weakened due to absorption in the material of the pipe wall. This beam is indicated by the dotted lines 38. The amount of weakening or absorption will depend, of course, upon the amount of material and therefore on the thickness of the wall. The measurement of intensity of the transmitted beam by the meter 32 can therefore be used as an indication of the wall thickness.

In Figure 2a are shown a pair of solid blocks of different thicknesses and of a suitable metal such as brass. One or both of these blocks can be inserted in the space between the radiation source holder 12 and the detector which is set at a predetermined position on the supporting member 10. Thereby a known amount of reduction of intensity in the gamma ray beam will be obtained and this can be used as a standard in calibrating the instrument.

Another method of obtaining a standard calibration consists in locating the housing 20 at a given position on the supporting member 10, for example, two inches and noting the meter reading, this, of course without the presence of any pipe or other absorbing medium between the source holder and the detector. If the instrument is operating properly the reading must equal that indicated for zero wall thickness in a calibration curve of the type shown in Figure 4 for a two inch pipe. This can be repeated for a different setting of the housing such, for example as eight inches, a new meter reading being obtained and checked against the calibration curve as set forth above.

In Figure 4 a set of calibration curves is shown in which for various thicknesses of iron the reading of the meter 32 is plotted for pipes of various thicknesses of from 2⅜ inches to 8½ inches outside diameter.

It has been found that with the arrangement described, in which a Geiger-Mueller counter of three inch length and one inch diameter is used as the detector, a source of one mg. of radium is satisfactory. With calibration curves as shown in Figure 4, for instance, available, the housing 20 is attached rigidly to the supporting member 10 by placing the indicator 28 at the scale mark 26 corresponding to the outside diameter of the pipe to be measured and the reading then taken with the pipe in tangential contact with the supporting member and the lower inner edge of the holder 12 as shown in Figure 1.

Obviously many modifications and variations of the invention, as hereinbefore set forth, may be made without departing from the spirit and scope thereof, but only such limitations should be imposed as are indicated in the appended claim.

I claim:

A device for measuring the wall thickness of a curved object comprising an elongated supporting member, a holder containing a source of gamma ray radiation mounted on the side of said supporting member, an elongated detector of said radiation mounted longitudinally on the same side of the supporting member as said source and separated from the source so as to provide a space therebetween, the object to be measured being adapted to be placed in said space against the supporting member and source and at right angles to the supporting member so that radiation from the source will pass tangentially through the object to said detector, the mounting means by which the detector is attached to the source being adjustable so as to control the length of said space whereby objects of different sizes can be accommodated and their wall thicknesses measured, a meter connected to the detector for indicating the intensity of the radiation transmitted through the object to the detector, and means for calibrating the device comprising a plurality of radiation absorbing members of different thicknesses, said absorbing members when inserted singly or collectively between the source and detector serving to reduce the intensity of transmitted radiation by a known amount.

GERHARD HERZOG.

REFERENCES CITED

The following references are of record in the file of this patent:

UNITED STATES PATENTS

| Number | Name | Date |
| --- | --- | --- |
| 2,094,318 | Failla | Sept. 28, 1937 |
| 2,315,819 | Schlesman | Apr. 6, 1943 |
| 2,349,429 | Herzog et al. | May 23, 1944 |
| 2,370,163 | Hare | Feb. 27, 1945 |
| 2,462,088 | Friedman | Feb. 22, 1949 |